United States Patent [19]

Koops

[11] Patent Number: 4,468,323

[45] Date of Patent: Aug. 28, 1984

[54] METHOD AND APPARATUS FOR CLEANING UP SURFACE WATER

[75] Inventor: Wierd Koops, Zoetermeer, Netherlands

[73] Assignee: Staat der Nederlanden, The Hague, Netherlands

[21] Appl. No.: 348,059

[22] PCT Filed: Jun. 11, 1981

[86] PCT No.: PCT/EP81/00072

§ 371 Date: Feb. 11, 1982

§ 102(e) Date: Feb. 11, 1982

[87] PCT Pub. No.: WO81/03671

PCT Pub. Date: Dec. 24, 1981

[30] Foreign Application Priority Data

Jun. 12, 1980 [NL] Netherlands ............... 8003412

[51] Int. Cl.³ ............................................. E02B 15/04
[52] U.S. Cl. ............................... 210/776; 210/242.3; 210/923
[58] Field of Search .............. 210/242.1, 242.3, 776, 210/923; 49/403, 74

[56] References Cited

U.S. PATENT DOCUMENTS

| | | | |
|---|---|---|---|
| 3,661,263 | 5/1972 | Peterson et al. | 210/923 |
| 3,701,430 | 10/1972 | Tuttle | 210/242.3 |
| 4,014,795 | 3/1977 | in't Veld | 210/242.1 |
| 4,056,472 | 11/1977 | Teandate | 210/242.1 |
| 4,182,679 | 1/1980 | van Hekle | 210/242.1 |

Primary Examiner—Peter A. Hruskoci
Assistant Examiner—Sharon T. Cohen
Attorney, Agent, or Firm—Edmund M. Jaskiewicz

[57] ABSTRACT

The present invention concerns a method and apparatus to be used in open water for removing an oil layer by towing a generally V-shaped and floating catching means (1, 2, 3) through the water, one arm (3) consisting of a barge comprising a driven pump (13) for sucking the oil collected near the apex of the catching means (2, 3) and for discharging this oil/water mixture into the barge; the water collecting near the bottom of the barge (2) is removed until the barge is mainly filled with oil; hereafter the filled barge is substituted by an empty one and the sweeping action may be continued.

8 Claims, 11 Drawing Figures

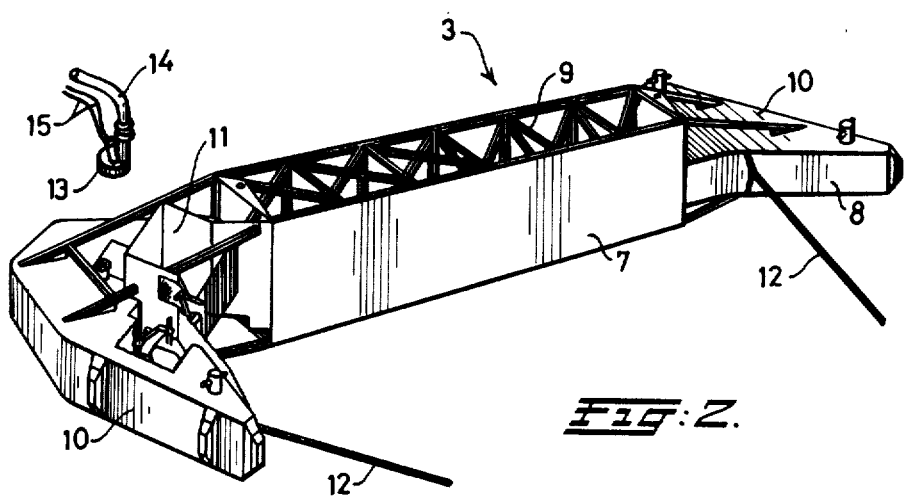
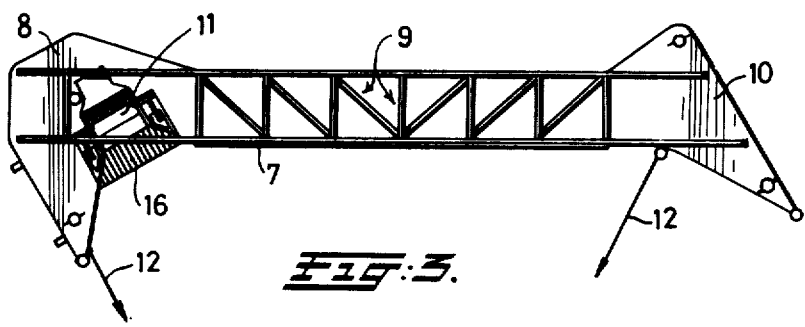
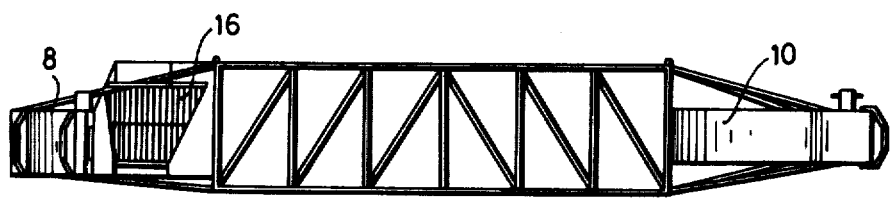

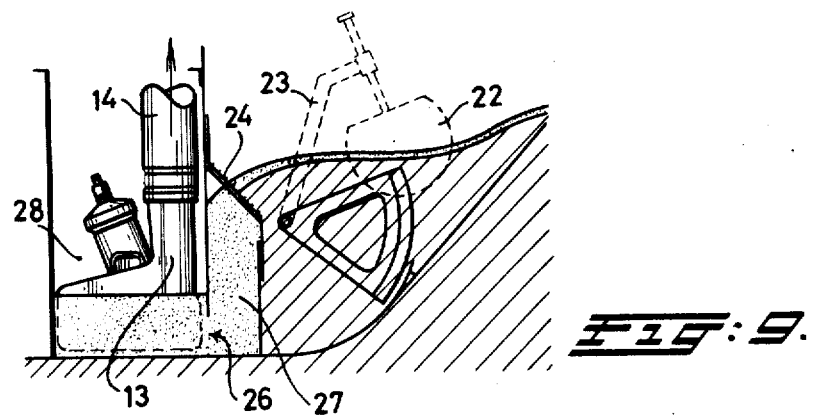
Fig: 9.
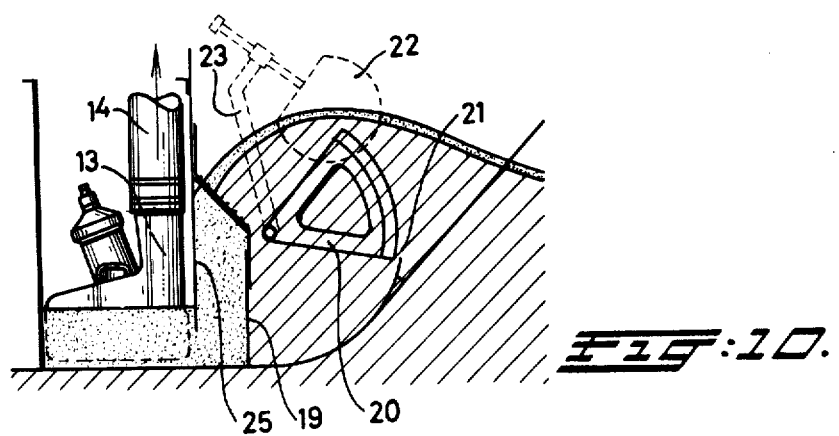
Fig: 10.
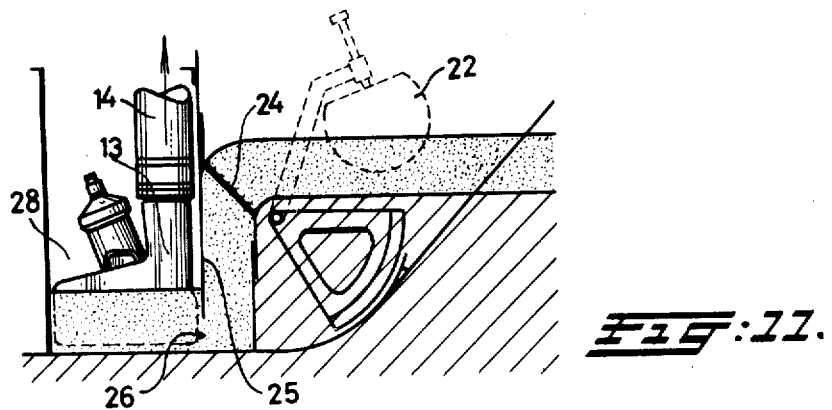
Fig: 11.

METHOD AND APPARATUS FOR CLEANING UP SURFACE WATER

BACKGROUND OF THE INVENTION

1. Field of the Invention

The invention relates to a method of removing an oil layer floating on water by means of towing sweeping arms which enclose a mutual diverging angle of less than 180°—seen in the towing direction—and wherein near a collecting place of oil a sucking up and pressing away of oil is performed.

Such a method is very urgent in case of accidents with oil tankers as a result of which an environmental catastrophe by pollution cannot, or only partly be prevented.

In case of an accident with a super tanker very large quantities of oil may be ejected and spoiled into the sea in an uncontrollable manner.

2. Description of the Prior Art

On applying the methods known up till now in some way a quantity of oil can be removed up to a maximum of 100 to 200 $m^3$ per hour. This limitation relates in general not only to a small areal capacity ($m^2$/h) depending on the apparatus to be used, but also to circumstances when no possibilities are available for storing large quantities of oil owing to which the cleaning activities (the method) always have (has) to be interrupted in order to pump over the collected oil or to remove the same.

It also been proposed in the art to store the collected oil in flexible containers; however, this appears to be not only costly but will also be difficult. Besides there is the important problem of safety, because oil on sea belongs to fuels (imco code II) having an inflammation point below 60° C.

In order to transport or handle such inflammable liquids aboard the work vessel a number of safety measures are to be carried out, especially relating to the storage of oil with a view to the crew's accommodation and to the position of the engine room.

SUMMARY OF THE INVENTION

It is a primary object of the present invention to provide a method which effectively solves the above described problems or which at least provides a considerable improvement of performing such a method.

According to the invention this is attained in that a floating barge or scow is applied as one of the sweeping arms, in combination with a sweeping arm pastened thereto, while a towboat is used fastened to the scow and to the sweeping arm by means of a tow cable, a mobile power unit on the scow driving a pump near one end of the sweeping arm which pump sucks in the reclaimed oil and pumps the latter into the scow whereas water having been separated from the oil is discharged from the lower part of the said scow.

The provision of a floating scow adapted for use on sea entails that in the method according to the invention a very only simple vessel need be used which can be towed in an inclined position by the towboat.

This sea going scow is equipped with a mobile displaceable power unit, mostly a so-called hydraulic power pack which can be obtained on the market. In the method according to the invention only one sweeping arm and a so-called plunge pump are required. With the aid of this sweeping arm and the long lateral side of the applied scow the oil floating on the water is swept towards the collecting place. The pump (mostly hydraulically driven) positioned at this place presses the collected oil/water mixture to a tank positioned on the sea-going scow.

A separation of air and water takes place in this tank after which the subjacent water is pumped overboard by means of a plung pump. As soon as the tank is filled with oil, a new stand-by scow can be fastened to the vessel and the filled scow whether or not in combination with preceding scows, can be returned to a nearby harbour. The mobile power unit on the disconnected scow is then transferred to the new scow.

As described above the method according to the invention provides the possibility of an almost uninterrupted cleaning up of a polluted sea surface with the aid of very simple means. A further advantage consists in that the invention permits a number of elements to keep stand-by at points along the coast which are most threatened. Said elements can immediately be put into operation after receiving an excessively large oil alarm. For such an operation only one sea-going scow suffices which can be kept under contract, whereas a towboart is mostly always available.

At the event of an alarm the towboat tows the scow with the sweeping arm and the additional equipment which has arrived in the meantime, to the location of the oil pollution. With respect to this it should be noted that several systems are available for having a sweeping arm arrive at the pollution point. Such an arm can be towed behind a sea-going scow or plaaced aboard this scow and subsequently be launched by means of davits. A sweeping arm can also be launched by a helicopter at the required location. At that polluted location the scow is manoeuvred under an angle, so that a considerable width of sweeping area is obtained. The sweeping arm is so positioned from the scow that the oil guided along the front lateral side of the scow can be collected. A pressure hose which has been connected to the pump at the collecting place can be put into the tank of the scow via a manhole and can be connected in a gastight manner by means of a specially shaped manhole lid. After having started the mobile power unit, the collection of oil from the surface of the sea can start.

The method according to the invention is preferably performed in such a manner that the scow moves under an angle of 60° with respect to the towing direction and with a velocity of about 1 m/sec, whereas the sweeping arm is also moved under an angle of about 60° due to which the arms include a mutual angle of about 120°.

The present invention is further embodied in an apparatus for performing the method as described above, comprising a towboat, at least two sweeping arms and a liquid pump. According to the invention one of the sweeping arms of this apparatus is formed by a floating scow provided with means for being connected to a tow boat and to a sweeping arm, a driving unit for the liquid pump being present on the scow, the sweeping arm being provided with a collecting place for oil to be collected.

DESCRIPTION OF THE DRAWINGS

FIG. 2 is a perspective view of an embodiment of the sweeping arm partly in an exploded form.

FIGS. 3 and 4 are plan views and front views of the sweeping arm of FIG. 2.

FIGS. 7-11 show various different situations near the collecting place of FIG. 6 in certain circumstances, concerning the sweeping speed, wave conditions and the thickness of an oil layer.

DESCRIPTION OF A PREFERRED EMBODIMENT

Figure 1:
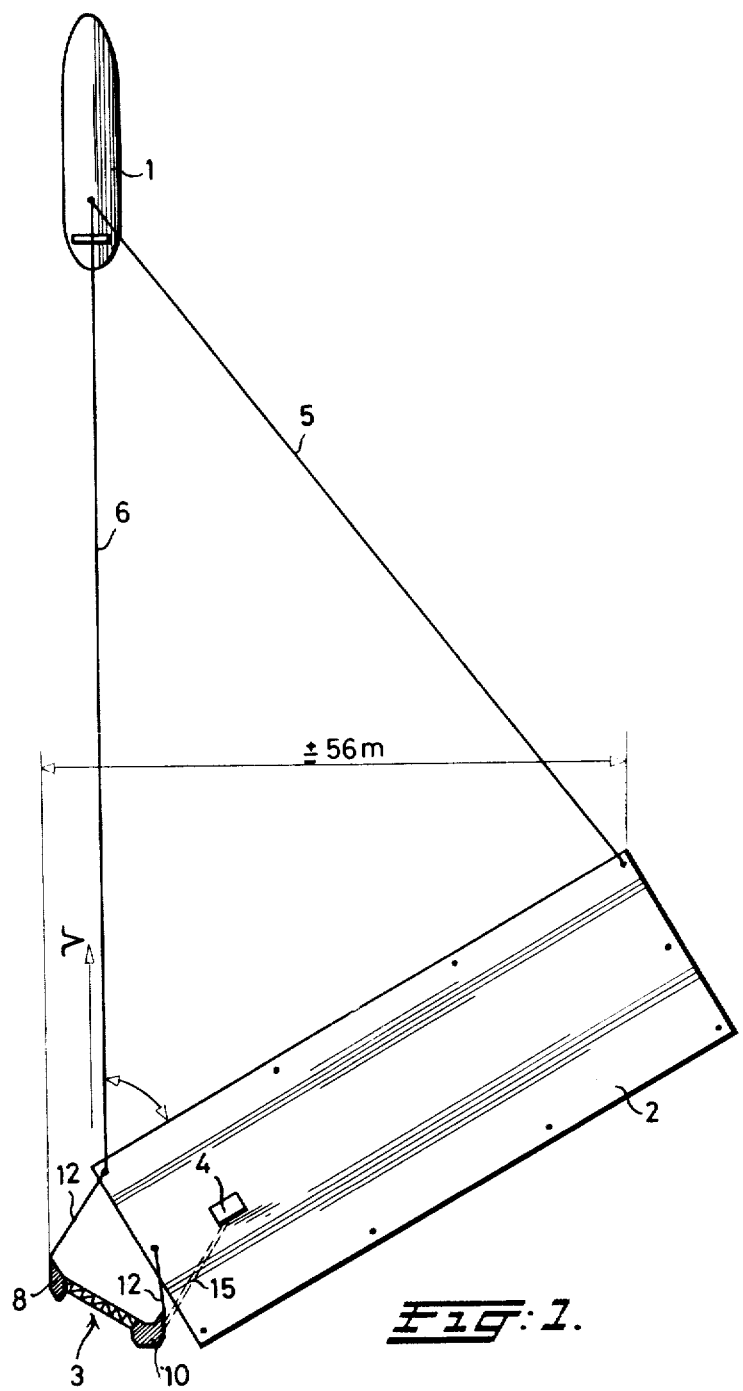
FIG. 1 shows a diagrammatic plan view of the important elements of the apparatus in their mutual arrangement and cooperation.
Figure 5:
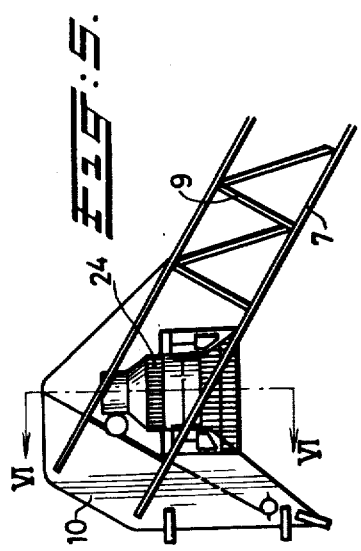
FIG. 5 shows a plan view of the collecting place for the collected oil.

As can be seen in FIG. 1, the apparatus according to the invention comprises a tow boat 1, a sea-going scow 2, a sweeping arm 3 and a mobile power unit 4 (driving unit). The scow 2 is so connected to the tow boat 1 by tow cables 5 and 6, that the long lateral side of the scow 2 is under an angle of about 60° with respect to the towing direction V. In the embodiment as shown the dimensions of the scow 2 are 60×20 m² while the total width of the sweeping area B across the tow direction V amounts to 56 m.

As appears from FIGS. 2 to 4 the sweeping arm 3 comprises a vertical wall 7 having an outer floating body 8 at one of its ends, which floating body is directed ahead in an inclined manner. The wall 7 is reinforced by means of a frame construction 9 forming the beam of the sweeping arm. An inner floating body 10 projects ahead at an almost straight angle at the other end of the wall 7. (A collecting space 11 in the form of a case, has been arranged in body 10 in which collecting space reclaimed oil or an oil/water mixture can be collected. The outer floating body 8 and the inner floating body 10 each are connected to the scow 2 (see FIG. 1) by a cable 12. A separate suction and pressure pump 13 with a pressure line 14 is also visible in FIG. 2. The pump 13 is driven by oil under pressure via lines 15 from a power unit 4.

Figure 6:
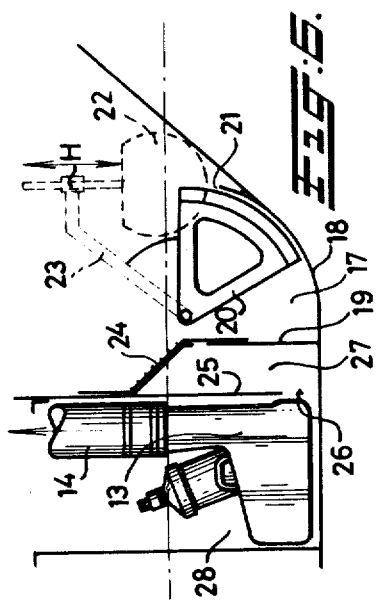
FIG. 6 is a cross-section on an enlarged scale according to line VI—VI in FIG. 5.

The collecting case 11 is covered at its front side by a coarse grate 16 as shown in FIGS. 2 to 5. This grate forms part of a hopper-shaped inlet to a first space 17 of the case 11. Said case is bounded by a bottom 18 and an overflow wall 19. A pivot (segment) 20 is so positioned in the space 17, that the curved side 21 is in alignment with an upwardly curved part of the bottom 18, so that said side 21 forms an overflow wall W, the position of which is adjustable by means of a float 22. As appears from FIG. 6 said float is connected to the segment 20 by means of an arm 23 and is adjustable with respect to the overflow wall W. Both ends of (segment) 20 comprise a float 22 said floats being acommodated in a lateral compartment of the collecting case 11.

The vertical rigid wall 19 forms, as it were, a second overflow wall which follows on the curved side 21 of the segment 20 which acts as a first overflow wall W. An inclined sieve grate 24 adjoins the upper edge of wall 19, the netting of said sieve grate being considerably finer than that of the coarse grate 16.

The upper end of the sieve grate 24 is connected to a vertical plunge wall 25, which leaves a passage 26 along the bottom 18. A second space 27 of the collecting case 11 is present between the walls 19 and 25 whereas beyond the passage 26 still a third space 28 is formed into which the plunge pump 13 is lowered.

Figure 7:
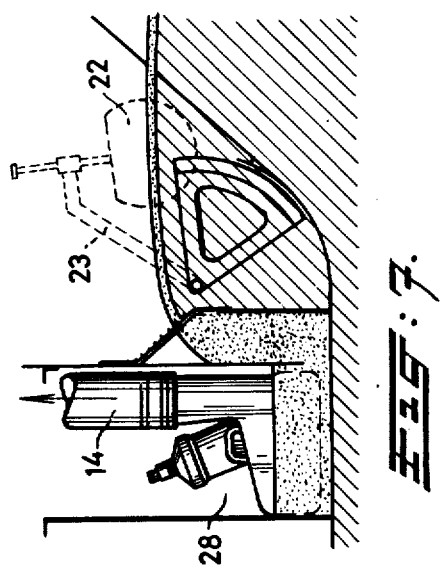
Figure 8:
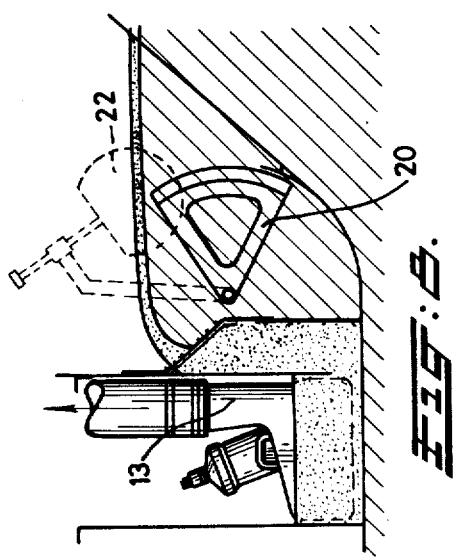

FIGS. 7 to 11 show a simplified view of the situation during the accomplishment of the method according to the invention. FIGS. 7 to 10 thereby show the presence of a thin oil layer, whilst FIG. 11 shows the presence of a thick oil layer. In the situation of FIG. 7, the tow boat 1 has little speed (about 1.8 km/h). FIG. 8 shows an elevated water surface wherein the speed of the tow boat 1 is three times higher (about 5,4 km/h). The first overflow wall W, remains always in the same position with respect to the water level.

FIGS. 9 and 10 show the situation when a swell is running whereby FIG. 9 illustrates the situation in a wave valley, whilst FIG. 10 shows a wave crest. In these cases the overflow wall W follows the alternating water level as a result of the connection with the two floats 22. At the time that a thick oil layer has to be handled the position of the floats 22 with respect to the pivot (segment) 20 is adjusted (see FIG. 11 and in this regard the preceding FIGS. 6 to 10). This adjustment can be effected by shifting each float 22 with respect to the arm 23 (denoted by arrow H in FIG. 6), or by adjustment of the angular position of arm 23 with respect to the pivot segment 20 (see arc A in FIG. 6). This possibility of adjusting the floats 22 with respect to the pivot segment 20 allows a maintenance of the function of the first overflow wall W, in view of which said wall keeps following any alterations in the water level. The oil or the mixture of oil and water collected in the third compartment 28 of the collecting case 11, is removed by the pump 13 and the pressure line 14 and transported to a tank of tanks (not shown) of the scow 2.

When receiving an alarm concerning an oil disaster, the present invention proceeds as follows.

A sea-going scow being available at that very moment is contracted. A tow boat which is mostly always available, subsequently transports, the scow and the sweeping arm(s) which meanwhile have arrived, together with the power unit and further equipment, towards the location of the oil pollution. It should be noted that the sweeping arm can also be transported aboard the towing vessel instead of on the scow of that it can towed behind said scow. At the polluted location, the cables 5 and 6 and the tow cables 12 are so positioned that the arrangement of FIG. 1 is obtained. The power unit 4 is started and the pressure line 14 is from the pump 13 within the collecting case 11, led towards the scow 2 so as to extend into the tank within said scow. At that moment the removal of the oil layer floating on the water surface is started.

It will be self-evident that the method according to the invention allows the operational costs to be kept as low as possible as practically no expensive components have to be kept stand-by. Furthermore various types of sea going scows can be used in the method according to the invention, while only one or more sweeping arms, one or more hydraulic power units and some hoses should be stored centrally and kept in maintenance, so that they are always available for a quick operation in case of calamities. The operation of the apparatus according to the invention can be world-wide and the required equipment can be transported easily by aeroplane or by seaplane. Sea-going scows and tow boats are mostly available along the greaver part of existing coastal areas. During the respective method the speed of the tow boat is limited to the event when oil will start to flow below the scow or below the sweeping arm. An upstream wall position under an angle will cause said speed to become higher in the direction V, as the angle between the scow and the sailing direction will get more acute. In practice an angle of 60° with respect to the sailing direction V has appeared to be favourable.

Under such a sweeping angle the minimum speed can be 0.5 m/sec. and the maximum speed 1.5 m/sec. while a practical speed amounts to 1 m/sec. which speed corresponds to two knots/h.

What is claimed is:

1. A method for removing oil floating on water comprising the steps of towing in a predetermined direction a sweeping system having a pair of deflecting elements enclosing an angle of less than 180° as seen in the direction of towing, one of said elements comprising a floating scow towed at an angle of 60° to the direction of towing and a second of said elements being an arm extending from the aft end of the scow and having a solid stationary vertical wall extending along the length thereof, said arm and scow defining an angle of about 120°, guiding the oil swept by the sweeping system along a surface of said scow and onto said vertical wall of said arm and into a collection place near the trailing end of the arm, said arm being provided with a submersed pump located in said collection place and pumping oil and water mixture collected in the collection place into the scow for subsequent separation in the scow, driving the pump by a mobile power unit located on the scow, and discharging water separated from the oil within the scow from the lower part of the scow whereby a scow fully loaded with oil can be replaced by an empty scow so as to continue the sweeping operation with a minimum of interruption.

2. A method according to claim 1, characterized in that the scow is moved with a speed of about 1 m/sec. whereby the sweeping arm is floating at the aft-zone of the barge, said sweeping arm also being towed under an angle of about 60° such that the whole sweeping system encloses an angle of about 120°.

3. A method according to claim 2, characterized in that a tow boat (1) is directly connected to the scow (2) by means of a tow cable (5,6) for pulling the entire sweeping system, the sweeping arm(s) being connected to the scow by means of a cable (12).

4. An apparatus for removing oil floating on water and comprising a sweeping system adapted to be towed by a tow boat in a predetermined direction and having a pair of deflecting elements enclosing an angle of less than 180° as seen in the direction of towing, one of said elements comprising a floating scow and the other of said elements comprising a floating arm extending from the aft end of said scow and having a solid stationary vertical wall extending along the length thereof, said scow being disposed at an angle of about 60° to the direction of towing and said arm and scow defining an angle of about 120° such that oil on water is guided along a surface of said scow onto said vertical wall of said floating arm, a collecting place being provided near the trailing end of said arm to receive oil and water mixture guided along said vertical wall, a mobile power unit on said scow, a liquid pump submersed within said collecting place and drivingly connected to said mobile power unit, said liquid pump having discharge means connected to said scow such that oil and water mixture is pumped therein for subsequent separation, and means in said scow for discharging the separated water from the scow.

5. Apparatus according to claim 10, characterized in that the arm (3) further comprises an outer floating body (8) at one end which floating body projects in a declined position ahead and which sweeping arm at its other end possesses an inner floating body (10) rectangularly projecting ahead of said outer floating body and containing the collecting place (11) for the caught oil.

6. Apparatus according to claim 5, characterized in that the collecting place (11) has been provided with a segment-shaped overflow wall (21) which is pivotably supported along the entire entry of the place and in that a float (22) is present which has been adjustably coupled to this wall in order that the wall can follow the variations in the level of the water surface.

7. Apparatus according to claim 5 or 6, characterized in that a stationary vertical second overflow wall (19) is disposed on the bottom wall (18) of the collecting place (11) said bottom wall being upwardly curved whereby its upper edge is connected to the lower edge of an inclined coarse gate (16), a finger grate (24) being provided at the upper edge of said second overflow wall, the upper edge of said finer grate being connected to a vertical plunge wall (25) bounding with said second wall (18) a second compartment (27) and leaving a passage (26) at the bottom of the collecting place leading to a third innermost compartment (28).

8. Apparatus according to claim 7, characterized in that the submersed liquid pump (13) for removing the caught oil towards the scow is situated within the innermost compartment (28) of the collecting space (11) lying behind the plunge wall (25).

* * * * *